Figure 1:
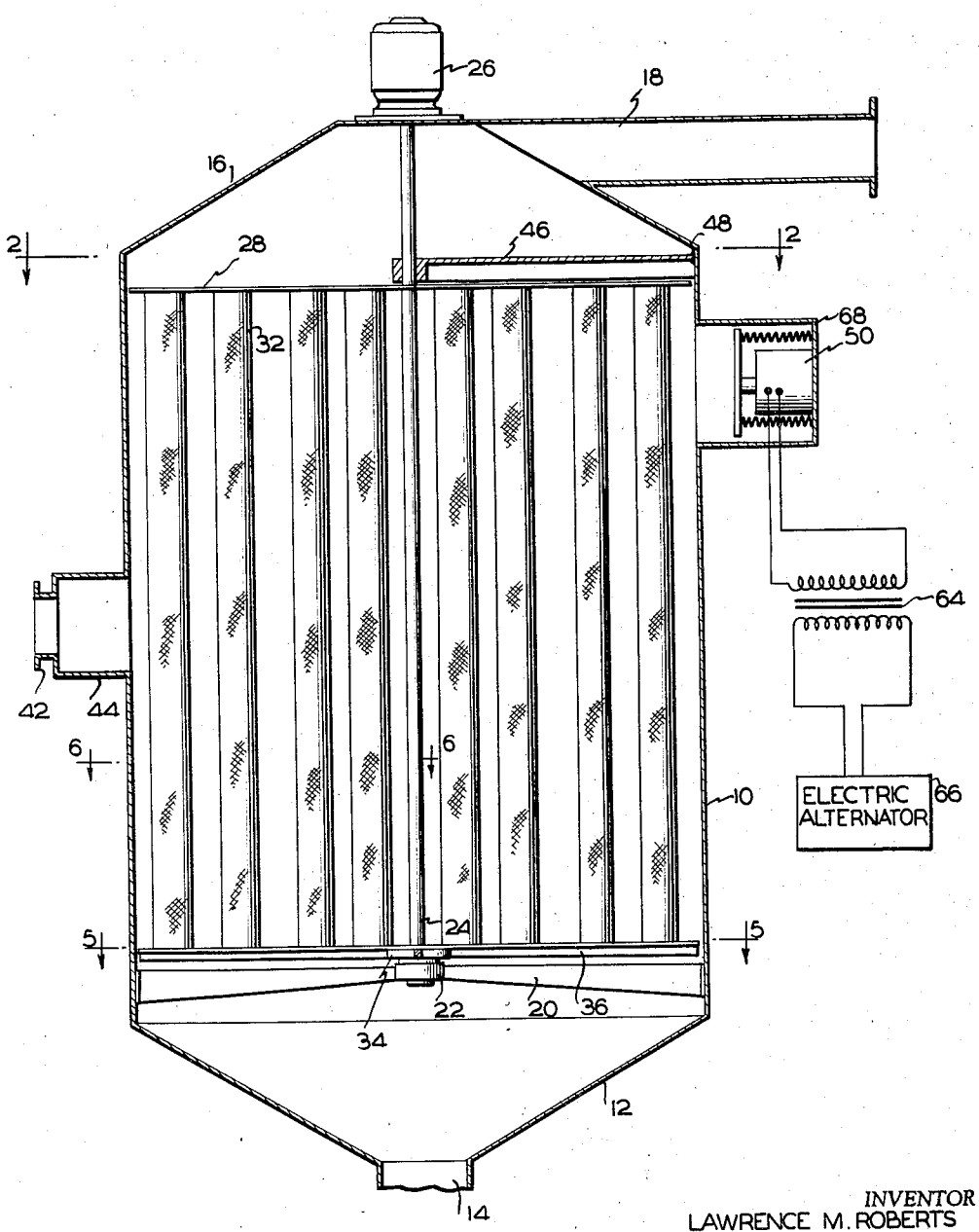

Sept. 30, 1958    L. M. ROBERTS ET AL    2,854,091
APPARATUS FOR CLEANING BAG FILTERS
Filed July 22, 1955    3 Sheets-Sheet 1

INVENTOR
LAWRENCE M. ROBERTS
HARRY J. WHITE

BY Harold T. Stowell
ATTORNEY

Sept. 30, 1958  L. M. ROBERTS ET AL  2,854,091
APPARATUS FOR CLEANING BAG FILTERS
Filed July 22, 1955  3 Sheets-Sheet 2
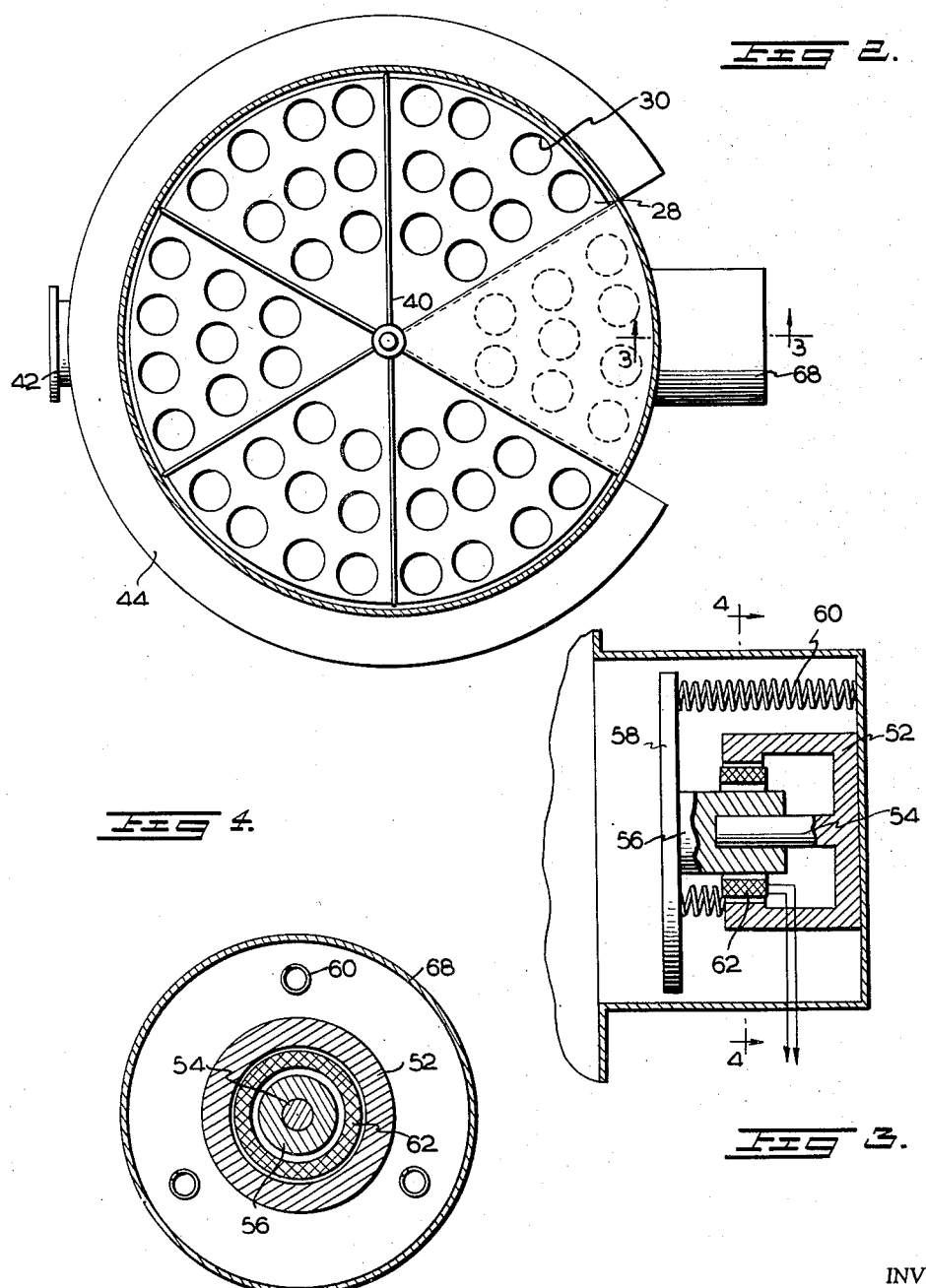
INVENTOR
LAWRENCE M. ROBERTS
HARRY J. WHITE
BY Harold T. Stowell
ATTORNEY Sept. 30, 1958   L. M. ROBERTS ET AL   2,854,091
APPARATUS FOR CLEANING BAG FILTERS
Filed July 22, 1955   3 Sheets-Sheet 3
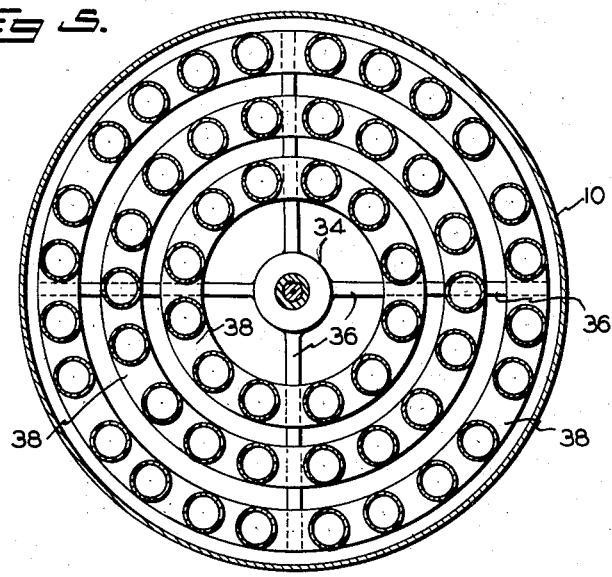
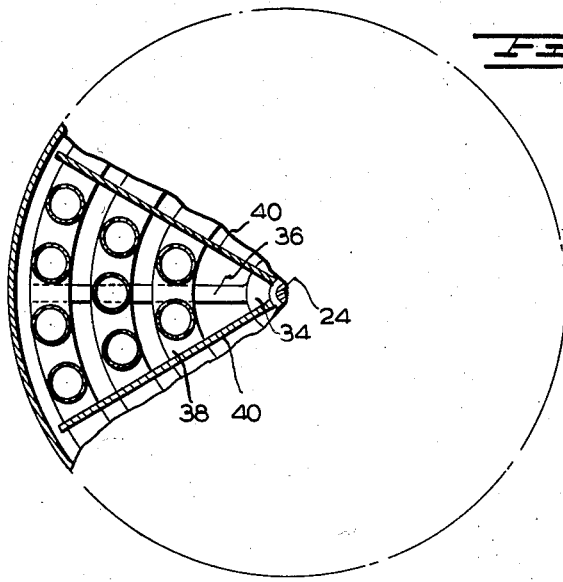
*INVENTOR.*
LAWRENCE M. ROBERTS
HARRY J. WHITE
BY
ATTORNEYS

United States Patent Office 2,854,091
Patented Sept. 30, 1958

2,854,091

APPARATUS FOR CLEANING BAG FILTERS

Lawrence M. Roberts, Bound Brook, and Harry J. White, Basking Ridge, N. J., assignors to Research Corporation, New York, N. Y., a corporation of New York Application July 22, 1955, Serial No. 523,912

1 Claim. (Cl. 183—54)

The present invention relates to new and improved apparatus for the cleaning of bags in bag-type air or gas cleaning filters.

It has heretofore been a general practice in the cleaning and removal of collected particles from bags in bag-type filters utilized in the cleaning of industrial gases to employ one of several types of shaking or vibrating mechanisms in which the vibrations are transmitted to the bags through the bag supporting structures within the filter or the bags are physically connected to a rapping device. In utilizing bag cleaning apparatus employing bag-vibrating mechanisms of these types it has been discovered that such apparatus causes deterioration and failure of the bag fabric, particularly in the regions surrounding the points of the bag support. Such failures and deterioration of the bags as is incurred with use of such bag cleaning mechanisms substantially reduces the collection efficiency of the filter and necessitates continual and costly repair and replacement of bags within the filter apparatus.

It is therefore a general object of the present invention to provide improved apparatus for cleaning bags of bag-type filters which eliminate those problems and disadvantages inherent in prior bag cleaning apparatus.

It is a primary object of the present invention to provide filter bag cleaning apparatus which employs rapid, controlled variations of the differential gas pressures on the two sides of the bag for cleaning and removing collected particles therefrom.

A further object of this invention resides in the provision of apparatus for producing a rapid, controlled variation of the differential gas pressures on the two sides of filter bags within gas filtering apparatus by means of a sudden impulsive change in the gas pressure on one side of the filter bag.

A still further object of this invention lies in the provision of new and improved apparatus for producing a cyclic variation through sound wave mediums to effect a rapid controlled variation in the gas pressures on a filter bag within gas filtering apparatus.

Still another object of this invention is the provision of new and improved apparatus for cleaning and removing collected particles from the filter bags of gas filtering apparatus which are of simple and inexpensive design and construction and which are durable and long lasting in use with attainment of continuous maximum efficiency during operation of the apparatus.

Still further objects and advantages of the present invention will become readily apparent to those skilled in the art when the following general statement and description are read in the light of the accompanying drawings.

The new and improved apparatus constituting the present invention may be described in general terms as including a filter shell having a gas inlet and a gas outlet, a plurality of filter bags supported in the shell intermediate the gas inlet and the gas outlet with one surface of the bags communicating with the gas inlet and the other surface of the bags communicating with the outlet, means dividing said plural bags into compartmented groups, a damper means adapted to close communication between one compartmented group of said bags and the gas outlet, means for alternately bringing said compartmented groups of bags into cooperative association with said damper, and means generating sound waves within the shell in the areas surrounding the compartmented bags while they are in operating association with said damper.

Referring now to the accompanying drawings in which like numerals designate similar parts throughout the several views:

Fig. 1 is a vertical elevation through gas filter apparatus constructed in accordance with the present invention.

Fig. 2 is a horizontal section taken on line 2—2, Fig. 1.
Fig. 3 is a vertical section taken on line 3—3, Fig. 2.
Fig. 4 is a vertical section taken on line 4—4, Fig. 3.
Fig. 5 is a horizontal section taken on line 5—5, Fig. 1.
Fig. 6 is a fragmentary horizontal section taken on line 6—6, Fig. 1.

Referring to Figs. 1 and 2 of the drawings there is illustrated a bag-type gas cleaner for removing suspended dust particles from industrial gases which consists of a cylindrical filter shell or casing 10 having a conical hopper-type bottom head 12 with a central discharge 14 therein, and a conical top head 16 having a side opening gas outlet 18 therein.

Located within the lower region of the shell immediately above the bottom head is a framework 20 which supports on the central axis of the shell a bearing 22. The bearing 22 rotatably receives and supports the lower end of a shaft 24 extending vertically along the longitudinal axis of the shell. The upper end of shaft 24 is connected to a motor 26 which produces controlled rotation of the shaft 24 within the filter shell.

The shaft 24 supports immediately below the top head 16 of the shell a circular header 28, as best seen in Fig. 2, which header has a radius slightlly less than that of the shell interior to permit rotation of the header with the shaft 24. The header is provided with a plurality of concentrically arranged rows of equally spaced openings 30. The upper end of a tubular filter bag 32 is supported about each of the openings. By this arrangement a plurality of filter bags 32 are suspended vertically within the filter shell in concentrically arranged rows. The central shaft 24 additionally supports at a point immediately above the bearing 22 in the lower end of the filter shell a skeletal frame or spider, as is best seen in Figs. 5 and 6, which includes a hub portion 34 concentrically about the shaft and a plurality of equally spaced radially extending arms 36 which support in horizontal positions a plurality of circular plates 38 with each of said plates being aligned beneath each of the concentrically arranged rows of filter bags 32. The lower ends of the bags 32 are secured to the ring plate 38 immediately therebeneath closing the bottom end of the bag and at the same time retaining it in vertical alignment beneath its point of suspension from the header 28.

The filter bags within the filter shell are divided segmentally of the shell into a plurality of groups, and the plural groups of bags are separated by partitions 40 which vertically interconnect the header and the spider. The partitions 40 are anchored at their inner ends to the shaft 24 and terminate at their other ends in close proximity to the inner wall of the filter shell. By this arrangement each segmental group of filter bags is housed within a compartment within the filter shell which is substantially gastight cirumferentially and at the top.

Associated with the filter shell is a gas inlet 42 connected to a jacket 44 on the outer wall of the shell which extends around the shell in both directions away from the inlet and terminates at points so as to isolate a portion of the shell wall equal to the peripheral portion of one of the segmented bag compartments within the shell. The gas inlet conduit which jackets the shell has continuous communication through the shell wall to provide for gas entry radially into the shell throughout the entire shell interior with the exception of the one segmented compartment about which the jacket does not overlie.

Associated with the compartmented area into which no gas access is provided is a plate-like damper 46 of pie-shaped configuration, corresponding to the plan configuration of the segmented compartment. The damper 46 is anchored, rotatably, at its apex to the central shaft 24 and anchored rigidly about its peripheral portion as at 48 to the inner wall of the shell to permanently locate the damper in a fixed position within the shell above the header 28. This damper 46 serves to cut off communication between the interiors of the filter bags in the segmented compartment therebeneath and the discharge outlet 18 in the upper head of the filter shell.

Thus in operation of the filter apparatus as described, dust ladened gases will be introduced through the inlet 42 into all but one of the segmented compartments of filter bags where the gas will flow about the outer surface of the fabric-type bags and, by reasons of pressure differentials outside and inside the bag, the gases will then pass through the fabric of the bags to flow upwardly therethrough to the upper head of the shell and outwardly through the outlet 18 leaving dust particles and the like collected upon the outer surfaces of the fabric bags to be removed therefrom, in manners to be hereinafter described, for collection in the hopper bottom 12.

Cleaning and removal of dust particles collected upon the filter bags is accomplished within each segmented compartment of bags as each compartment is brought into coincidence beneath the damper 46 by rotation of the shaft 24, header 28, and skeletal frame 36. Cleaning of the bags is accomplished when the bag compartment is so located, by operation of a sonic oscillator 50 positioned on the filter wall. The sonic oscillator serves to produce sound waves within the confines of the single bag compartment thereby producing rapid variations in the differential gas presures outside and inside the bag causing rapid vibration of the bags to dislodge collected particles and materials thereon which fall by gravity through the skeletal frame 36 into the hopper bottom from which they are discharged.

With regard to the utilization of a sonic oscillator for the generation of sound waves to produce rapid controlled variations in differential gas pressures within the bag filter, it is desirable to point out that the particular sonic oscillator disclosed herein provides for substantially new and useful improvements over previous constructions.

Sound wave generators have been developed which have included high power generators operating on the fundamental principles of the siren, mechanically and electrically driven oscillator and, to a limited degree, electromagnetic operation of metallic bars and rods. However, these prior devices have proved unsatisfactory for industrial sonic rapping because of the severe mechanical design problems and weaknesses inherent in their construction and additionally because of the basic and fundamental difficulties inherent in obtaining effective coupling to the gas to be treated.

Particularly, prior electromagnetically driven mechanical oscillators have been inherently unsuitable by reason of their restriction to high frequencies with low outputs and because of the limitations incurred in the provision of metallic bar oscillating elements.

The particular sonic oscillator disclosed herein is of such a construction and operation as to be capable of efficiently producing high power output at low frequencies in the order of 1000 C. P. S. or less thereby eliminating substantially all of the problems and difficulties inherent in the prior construction. This is particularly true since in the present construction it is possible to control the drive of the oscillator at its resonant frequency by the simple expedient of adjusting an electric alternator to a frequency which corresponds to the natural frequency of the oscillator.

By adjusting the frequency of the oscillator through the frequency of the driven alternator a highly efficient oscillator, attaining maximum intensity, can be obtained with effective coupling to the gas medium by providing an output piston of a diameter substantially equal to one-half the wave length of sound in the gas to which it is to be coupled.

The particular construction of the sonic oscillator, which is best seen in Figs. 3 and 4, includes the combination of a piston-type, mass-and-spring mechanical oscillator with an electromagnetic driving element powered by a conventional electric alternator.

Specifically, a cup-like electromagnet 52 is provided with a central upstanding circular post 54 on which is telescopically and slidably mounted a stem 56 which carries thereon a large diameter output piston 58. The output piston 58 is seated, at spaced points circumferentially about the face thereof disposed toward the magnet 52, against coil springs 60 of predetermined and calculated compression which normally bias the piston and its stem 56 outwardly away from the magnet 52.

The magnet 52 is provided with a coil 62 which concentrically surrounds the stem 56 which coil is connected through a step-down transformer 64 to an electric alternator 66 driven as described at a tuned frequency.

Upon operation of the oscillator, which is mounted within a housing 68 on the wall of the filter shell which communicates with the interior of the filter, the output piston 58 will be caused to vibrate through the alternate excitation of the coil 62 and the bias action of the springs 60 to generate high output low frequency sound waves within the filter bag compartment associated therewith.

While only a single form of generator has been described for producing controlled and rapid vibrations of the bag filter, it will be evident that impulse vibrations caused by the sudden, impulsive release of gas or by explosive effects may be employed as the driving force for setting the gas in the chamber to be rapped into motion.

Thus having described and explained the novel and improved apparatus constituting the present invention in all of its parts, combinations and sub-combinations, and having described and explained the new and useful results obtained by the present invention, what is desired to be claimed is:

In gas cleaning filter apparatus, a substantially vertically extending shell having a dirty gas inlet, a clean gas outlet, and a hopper bottom for discharging collected particulate material, a plurality of filter bags rotatably supported within said shell above said hopper bottom, the exterior surfaces of said filter bags having communication with said dirty gas inlet and the interior surfaces of said filter bags having communication with said clean gas outlet, damper means disposed within said shell between the exterior surfaces of said filter bags and said clean gas outlet, means for selectively positioning a number of said filter bags within the zone defined by said damper means, and electromagnetically driven sonic oscillating means positioned in the slide wall of said shell between said dirty gas inlet and said clean gas outlet and closely adjacent the exterior surface of said filter bags within the zone defined by said damper means for producing rapid variations in differential gas pressures inside and outside said filter bags when said bags are positioned within said damper means whereby said pressure variations effectively cause particulate material collected on the exterior surfaces of said filter bags to be removed therefrom and discharged through said hopper bottom.

(References on following page)

References Cited in the file of this patent

UNITED STATES PATENTS

| | | |
|---|---|---|
| 1,791,102 | McDevitt | Feb. 3, 1931 |
| 2,432,218 | Vang | Dec. 9, 1947 |
| 2,500,851 | Miller | Mar. 14, 1950 |
| 2,519,082 | Stevenson | Aug. 15, 1950 |
| 2,703,874 | Allen | Mar. 8, 1955 |
| 2,769,103 | Kristiansen | Oct. 30, 1956 |
| 2,769,506 | Abboud | Nov. 6, 1956 |

FOREIGN PATENTS

| | | |
|---|---|---|
| 875,908 | Germany | May 7, 1953 |

UNITED STATES PATENT OFFICE
CERTIFICATE OF CORRECTION

Patent No. 2,854,091 September 30, 1958

Lawrence M. Roberts et al.

It is hereby certified that error appears in the printed specification of the above numbered patent requiring correction and that the said Letters Patent should read as corrected below.

Column 4, line 63, for "positioned in the slide wall" read -- positioned in the side wall --.

Signed and sealed this 23rd day of December 1958.

(SEAL)

Attest:

KARL H. AXLINE
Attesting Officer

ROBERT C. WATSON
Commissioner of Patents